W. P. ORSINGER.
SPARK PLUG.
APPLICATION FILED OCT. 18, 1919.
1,384,914.
Patented July 19, 1921.
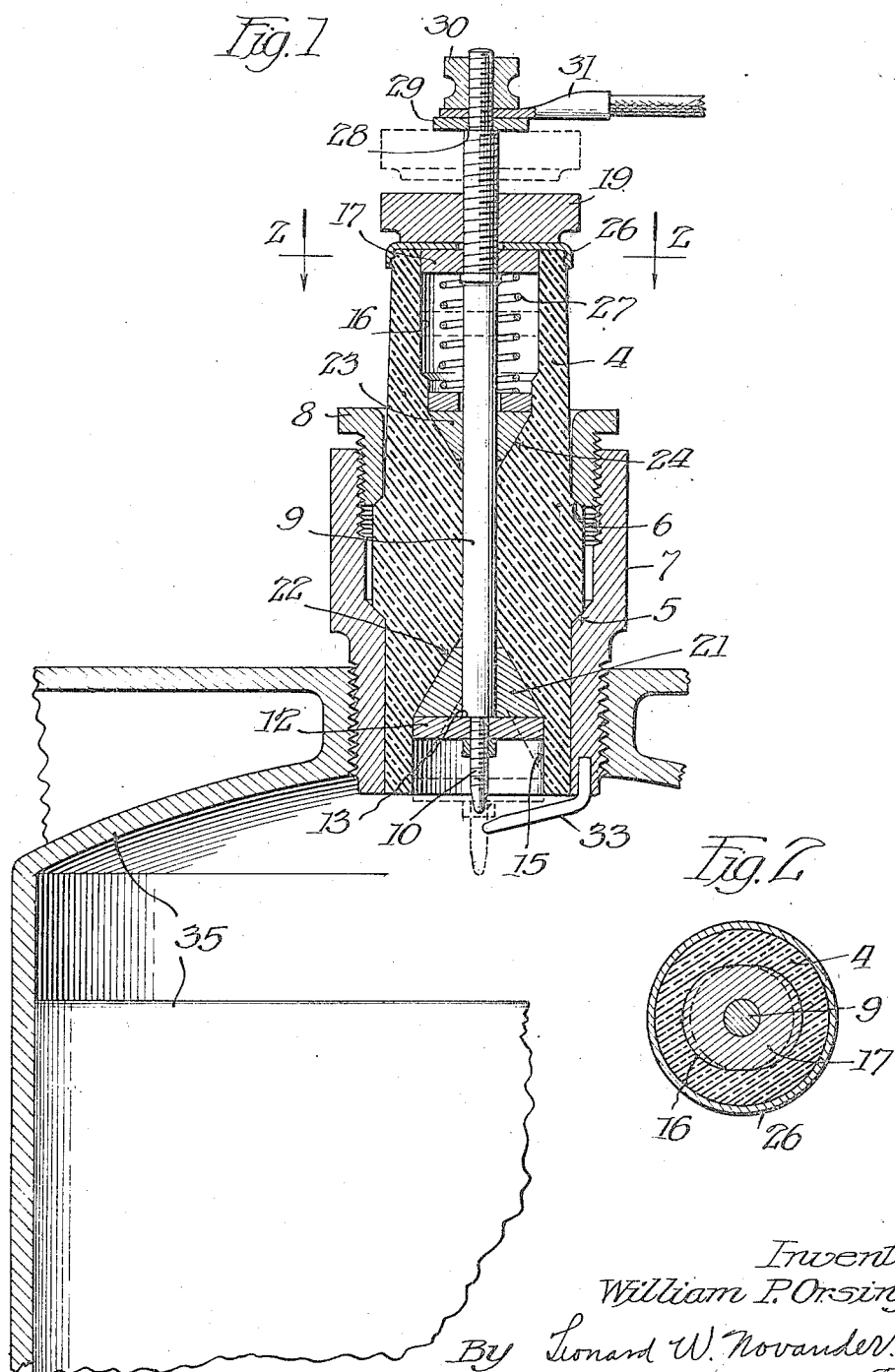
Inventor:
William P. Orsinger,
By Leonard W. Novander
Atty.

UNITED STATES PATENT OFFICE.

WILLIAM P. ORSINGER, OF CHICAGO, ILLINOIS.

SPARK-PLUG.

1,384,914.   Specification of Letters Patent.   Patented July 12, 1921.

Application filed October 18, 1919. Serial No. 331,653.

*To all whom it may concern:*

Be it known that I, WILLIAM P. ORSINGER, a citizen of the United States, residing at Chicago, in the county of Cook and State of Illinois, have invented a new and useful Spark-Plug, of which the following is a specification.

My invention relates to spark plugs, and has for its object the provision of means for automatically or manually removing the carbon and cleaning the parts without removing the plug from the engine. My invention contemplates a spark plug with an electrode which is movable, preferably only when it is desired to clean the points and other parts on the inner end of the plug.

My invention comprises a plug having a central or inner spindle which forms at its innermost end one of the points forming the gap across which the spark jumps. This spindle, when loosened, can be moved or reciprocated automatically or manually to cause a frictional engagement of the two spark points; and also a frictional scraping action of a plunger carried by the spindle end and which bears against the bore of the insulation member forming part of the plug.

My invention will be better understood by reference to the accompanying drawing in which, Figure 1 is a longitudinal sectional view of a plug embodying the principle of my invention, and showing it in place in an engine.

Fig. 2 is a sectional view taken on line 2—2 of Fig. 1.

In the preferred embodiment of my invention I employ an insulation member 4 of porcelain, or other material, which is provided with shoulders 5 and 6 which are clamped between similar surfaces of the outer shell 7 and nut 8 respectively.

The insulation member 4 is cored out to receive a spindle 9 provided with preferably a reduced inner portion 10 forming one of the spark points. A plunger 12 is fastened rigidly to the spindle against the shoulder 13 so that upon movement or reciprocation of the spindle, said plunger will effect a scraping or rubbing action on the bore 15 of the insulating member 4, thus removing any carbon or other matter deposited thereon.

I find it desirable to provide means for preventing the spindle 9 from turning, and to this end the insulation member 4 is provided at its outer portion with an elliptical shaped recess or hole 16 which accommodates an elongated washer 17 secured on the spindle. This construction prevents the spindle from turning when the nut 19 tightens the spindle in position so that the conical packing 21 is forced against a similar surface 22 on the insulation member. This packing of non-combustible material as well as the conical packing 23 bearing against the surface 24 prevents any gas from escaping from the engine. As a further means in this particular a dished washer 26 is preferably threaded to the outer end of the insulation member 4 as shown. Normally a spring 27 presses the spindle 9 and washer outwardly so that the parts assume the position as shown in full lines. The extreme outer end of the spindle is preferably diminished so as to form a shoulder 28 against which a washer 29 bears. A thumb nut 30 serves to clamp the clip 31 of the wire leading to the source of energy, against said washer.

When it is desired to clean or brighten the spark points, the nut 19 is screwed up so that it is brought against the under side of the washer 29 as shown in dotted lines, whereupon the spindle may be pressed downwardly until the nut 19 strikes the washer 26, thus forcing the point 10 to the dotted position. This action forces this point against the yieldable arm or point 33 carried by the shell 7, whereby any carbon or deleterious material is removed from both members. At the same time the bore 15 is cleaned by the plunger or scraper 12. As soon as pressure is relieved, the spring 27 forces the parts back into normal position as shown. It is only necessary to force the parts into contact a few times to effect a cleaning so that the plug will function properly, and further, this operation takes but a few moments without removing the plug from the engine, and without disturbing the adjustment of the spark gap.

I have found in practice that by simply bringing the nut 19 against the washer 29, and then starting the engine and allowing it to run for a few moments, will automatically cause an up and down movement of the spindle 9 and plunger 12 due to the suction and compression of the engine 35. This action takes place because of the comparatively large area of the plunger 12. After a short period the engine can be stopped, and the nut 19 screwed down to its normal position, which brings the spark points to the position desired.

While I have herein shown and described one particular embodiment of my invention, I do not wish to be limited to the precise arrangement shown, since it will be apparent that modifications may be made without departing from the spirit and scope of my invention.

I claim:

1. In combination, a spark plug having a reciprocating electrode, and a device serving in one position for normally holding said electrode a predetermined distance from the stationary electrode, said device, when moved to its alternate position on said electrode permitting said electrode to be reciprocated by the suction and compression of the engine.

2. A spark plug having a movable inner electrode, a device for maintaining said electrode in its normal position away from the stationary electrode in said plug, said device, when adjusted serving to permit actuation of said movable electrode s that it will frictionally engage the stationary electrode, and packing members coöperating with said movable electrode.

3. In combination, a spark plug having a reciprocating electrode, and a tightening nut serving in one position for normally holding said electrode a predetermined distance from the stationary electrode, said nut, when moved to its alternate position on said electrode permitting said electrode to be moved by the suction and compression of the engine.

4. In combination, a spark plug having a reciprocating electrode, and a manually operated mechanism for normally holding said electrode a predetermined distance from the stationary electrode, said mechanism, when loosened permitting said electrode to be moved up and down by the suction and compression of the engine.

5. In combination, a spark plug having a movable electrode, a stationary electrode projecting into the path of said movable electrode, an insulating member, conical shaped packing for said movable electrode, and a device for normally holding said movable electrode a certain distance from the stationary electrode.

6. In combination, a spark plug having a reciprocating electrode, a piston on said electrode, a tightening nut for normally holding said electrode a certain distance from the stationary electrode, said nut when moved to its alternate position on said electrode permitting said electrode to be reciprocated by the suction and compression of the engine, packing members coöperating with said reciprocal electrode, and resilient means pressing against one of said packing members.

7. A spark plug comprising a stationary terminal, an insulating member provided with inner and outer recesses, a movable terminal adapted in one position to frictionally engage said stationary terminal, a packing member carried on said movable terminal and engaging the inner recess, a spring pressed packing member occupying said outer recess, a tightening nut having threaded engagement with said movable terminal, and a washer carried by said movable terminal within said outer recess.

8. A spark plug comprising a stationary terminal, an insulating member provided with inner and outer enlarged bores, a movable terminal adapted in one position to frictionally engage said stationary terminal, a packing member mounted on said movable terminal and engaging the enlarged inner bore, another packing member occupying said enlarged outer bore, and means within said outer bore to prevent rotation of said movable terminal.

9. A spark plug comprising a stationary terminal, an insulating member having an outer recess, a movable terminal adapted in one position to frictionally engage said stationary terminal, a packing member occupying said recess, and a device within said recess to prevent rotation of said movable terminal.

WILLIAM P. ORSINGER.